Patented Sept. 26, 1933

1,928,399

UNITED STATES PATENT OFFICE 1,928,399

PROCESS FOR TREATING WATER SOLUTIONS

Oliver M. Urbain, Columbus, Ohio, assignor to Charles H. Lewis, Harpster, Ohio

No Drawing. Application October 24, 1931
Serial No. 570,986

15 Claims. (Cl. 210—9)

This invention relates to a process of water purification. Specifically the invention comprehends a process for removing from a water solution such contaminating organic substances as alcohols, amines and phosphoric esters.

The alcohols which it is contemplated to remove from the water solution have the general formula R—OH (where R=any hydrocarbon radical, either substituted or unsubstituted).

The amines which it is contemplated to remove from the water solution are primary R.NH$_2$, secondary

and tertiary

(where R, R' and R'' equal any hydrocarbon radical either substituted or unsubstituted).

The phosphoric esters have the amine grouping and act much the same as the amines.

The process is one of precipitation and the contaminating organic substances mentioned are all susceptible to precipitation by a common precipitant, namely, an acyl halide.

The term "acyl" as used in this specification shall be understood to mean or include any radical derived from an acid by the replacement of one or more OH groups of the acid by one or more halogen atoms; said acid might be an organic acid such as acetic, benzoic or benzene sulfonic acid, or it may be an inorganic acid such as phosphoric or sulfuric acid.

As the reaction of the acyl halides with the alcohols, amines and the phosphoric esters proceeds very slowly and as the acyl halides react with water the use of a catalyst which will insure the completion of the first reaction before the second reaction makes any appreciable progress, is essential. I have found that there are two classes of catalysts which will effect this result. The first class embraces the soluble salts of the variable valent metals, the metal ion of which is susceptible to oxidation, to a higher valent state partially or wholly by the dissolved oxygen in water. The second class embraces the dispersions of colloidal metals.

Examples of the first class are ferrous salts and cuprous salts. Examples of the second class are tungsten and copper.

In carrying out the process, therefore, the water containing the organic substances is treated with an acyl halide; typical examples of the acyl halides are:

Benzoyl chloride C$_6$H$_5$COCL.
Ortho; meta or para-toluyl chloride
    CH$_3$C$_6$H$_4$COCL.

1 or 2 naphthoyl chloride C$_{10}$H$_7$COCL.
Anthraquinonecarbonyl chloride.

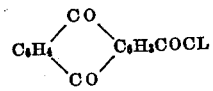

The alcohols, on treatment with any of the acyl halides, form esters. The reaction takes place in dilute water solutions and the esters formed are insoluble. Of the acyl halides the chloride is preferable because it is the cheapest. When the alcohol is in a water solution the acyl halides having aromatic or heterocyclic groupings are best for ester formation. The reaction proceeds best in an alkaline solution since acid is one of the end products of the reaction. The reaction is shown as follows:

$$R—COX + R'—OH = R—COOR' + HX$$

where R equals any aromatic or heterocyclic residue, either substituted or unsubstituted; R' equals any hydrocarbon radical either substituted or unsubstituted; X equals any halogen.

A specific example of the reaction showing the precipitation of an alcohol with an acyl halide is given as follows:

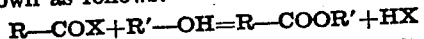

Examples of the reactions for the removal of the amines by treating with an acyl halide are as follows:

(1) 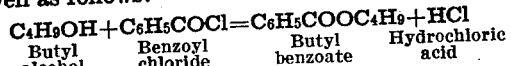

(2) 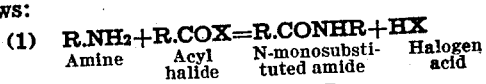

A typical example of the phosphoric esters is lecithin which is a monoamino-monophosphatide found in many organic substances such as animal and vegetable tissues and in eggs. It has the following formula:

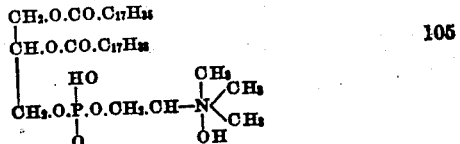

The grouping on the lower right end of the structural formula above is the reactive group. Starting with this grouping we have the following reaction with the acyl halides:

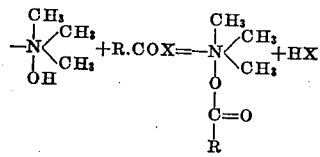

In carrying out the process to remove either or all of the enumerated organic substances; namely, alcohols, amines and phosphoric esters, it is only necessary to determine the quantity of the substance or substances present in the solution and compute the amount of acyl halide required to react therewith. The acyl halide is then added in the form of a solution with agitation. The process may be practiced as a continuous operation or as a batch operation depending upon the conditions to be met.

The water solution to be treated should be maintained at a pH above 7, preferably from pH 8.5 to pH 10.

From the foregoing it is apparent that a process has been devised for precipitating alcohols, amines and phosphoric esters from a water solution and it is to be understood that the description given is illustrative only and that the invention is limited only by the scope of the appended claims.

What I claim as my invention is:

1. A method for removing from a water solution alcohols, amines and phosphoric esters comprising treating the water solution containing such substances with an acyl halide in the presence of a catalyst.

2. A method for removing alcohols from water solutions comprising treating the solution with an acyl halide in the presence of a catalyst to react with the alcohols and form an insoluble ester.

3. A method for removing amines from water solutions comprising treating the solution with an acyl halide in the presence of a catalyst to react with the amines and form insoluble amides.

4. A method for removing phosphoric esters from water solutions comprising treating the solution with an acyl halide in the presence of a catalyst to react with the phosphoric esters and form a preciptate.

5. A method for eliminating from water solutions alcohols, amines and phosphoric esters comprising maintaining the water solution at a pH value above 7 and introducing thereto an acyl halide in an amount adequate to react with the alcohols, amines and phosphoric esters present in the solution being treated, in the presence of a catalyst.

6. A method for removing from a water solution alcohols, amines and phosphoric esters comprising treating the water solution containing such substances with an acyl halide in the presence of a soluble salt of a variable valent metal, the metal ion of which is susceptible to oxidation to a higher valent state partially or wholly by the dissolved oxygen in water.

7. A method for removing alcohols from water solutions comprising treating the solution with an acyl halide in the presence of soluble salt of a variable valent metal, the metal ion of which is susceptible to oxidation to a higher valent state partially or wholly by the dissolved oxygen in water to react with the alcohols and form an insoluble ester.

8. A method for removing amines from water solutions comprising treating the solution with an acyl halide in the presence of a soluble salt of a variable valent metal, the metal ion of which is susceptible to oxidation to a higher valent state partially or wholly by the dissolved oxygen in water, to react with the amines and form insoluble amides.

9. A method for removing phosphoric esters from water solutions comprising treating the solution with an acyl halide in the presence of a soluble salt of a variable valent metal, the metal ion of which is susceptible to oxidation to a higher valent state partially or wholly by the dissolved oxygen in water to react with the phosphoric esters and form a precipitate.

10. A method for eliminating from water solutions alcohols, amines and phosphoric esters comprising maintaining the water solution at a pH value above 7 and introducing thereto an acyl halide in an amount adequate to react with the alcohols, amines and phosphoric esters present in the solution being treated in the presence of a soluble salt of a variable valent metal, the metal ion of which is susceptible to oxidation to a higher valent state partially or wholly by the dissolved oxygen in water.

11. A method for removing from a water solution alcohols, amines and phosphoric esters comprising treating the water solution containing such substances with an acyl halide in the presence of a dispersion of a colloidal metal.

12. A method for removing alcohols from water solutions comprising treating the solution with an acyl halide in the presence of a dispersion of a colloidal metal to react with the alcohols and form an insoluble ester.

13. A method for removing amines from water solutions comprising treating the solution with an acyl halide in the presence of a dispersion of a colloidal metal to react with the amines and form insoluble amides.

14. A method for removing phosphoric esters from water solutions comprising treating the solution with an acyl halide in the presence of a dispersion of a colloidal metal to react with the phosphoric esters and form a precipitate.

15. A method for eliminating from water solutions alcohols, amines and phosphoric esters comprising maintaining the water solution at a pH value above 7 and introducing thereto an acyl halide in an amount adequate to react with the alcohols, amines and phosphoric esters present in the solution being treated in the presence of a dispersion of a colloidal metal.

OLIVER M. URBAIN.